(12) United States Patent
Spitzer et al.

(10) Patent No.: US 10,920,809 B2
(45) Date of Patent: Feb. 16, 2021

(54) SYSTEM FOR FASTENING A PLANAR ELEMENT TO A COMPONENT AND FASTENING CLIP FOR USE IN SUCH A SYSTEM

(71) Applicant: Charlotte Baur Formschaumtechnik Gmbh, Mindelheim (DE)

(72) Inventors: David Spitzer, Mindelheim (DE); Otto Demel, Heidelberg (DE); Markus Endres, Heidelberg (DE); Michael Gerhardt, Heidelberg (DE)

(73) Assignee: CHARLOTTE BAUR FORMSCHAUMTECHNIK GMBH

( * ) Notice: Subject to any disclaimer, the term of this patent is extended or adjusted under 35 U.S.C. 154(b) by 0 days.

(21) Appl. No.: 16/342,906

(22) PCT Filed: Oct. 17, 2017

(86) PCT No.: PCT/EP2017/076523
§ 371 (c)(1),
(2) Date: Apr. 17, 2019

(87) PCT Pub. No.: WO2018/073272
PCT Pub. Date: Apr. 26, 2018

(65) Prior Publication Data
US 2019/0242419 A1    Aug. 8, 2019

(30) Foreign Application Priority Data

Oct. 20, 2016   (DE) .................... 20 2016 008 380.6

(51) Int. Cl.
*F16B 5/06*   (2006.01)
*F16B 2/24*   (2006.01)
(Continued)

(52) U.S. Cl.
CPC ............ *F16B 5/0692* (2013.01); *B60R 13/08* (2013.01); *F16B 2/243* (2013.01); *F16B 21/086* (2013.01); *B60R 2013/0807* (2013.01)

(58) Field of Classification Search
CPC ...... F16B 5/0692; F16B 2/243; F16B 21/086; B60R 13/08; B60R 2013/0807;
(Continued)

(56) References Cited

U.S. PATENT DOCUMENTS 2,459,953 A * 1/1949 Mills ......................... E04B 1/40
403/9
2,618,033 A * 11/1952 Tinnerman .............. F16B 5/125
248/68.1

(Continued)

FOREIGN PATENT DOCUMENTS

FR       2 700 587 A1    7/1994
WO    WO 2015007277      1/2015

OTHER PUBLICATIONS

International Search Report.

*Primary Examiner* — Robert Sandy
*Assistant Examiner* — Rowland Do
(74) *Attorney, Agent, or Firm* — Greg M. Popowitz; Assouline & Berlowe, P.A.

(57) ABSTRACT

The invention includes a system for fastening a planar element, which has a cut-out to a component, which has a borehole having a screw thread 5, including a fastening clip, which has a contact section having at least one contact plane for contacting a first side of the planar element facing away from the borehole, the fastening clip having an elastic first retaining element in a connection section, which first retaining element is connected to the contact section and is designed in such a way that, after the planar element 10 has been fastened, the first retaining element reaches through the (Continued)

cut-out of the planar element into the borehole when the contact plane lies on the first side of the planar element.

11 Claims, 2 Drawing Sheets

(51) Int. Cl.
*F16B 21/08* (2006.01)
*B60R 13/08* (2006.01)

(58) Field of Classification Search
CPC ......... Y02E 10/72; Y02E 60/16; F03D 15/00; F03D 9/12
See application file for complete search history.

(56) References Cited

U.S. PATENT DOCUMENTS

| | | | | |
|---|---|---|---|---|
| 2,775,010 | A | * | 12/1956 | Bedford, Jr. ........ B60R 13/0206 24/581.11 |
| 2,825,948 | A | * | 3/1958 | Parkin ..................... F16B 9/023 411/477 |
| 8,469,438 | B2 | * | 6/2013 | Mazur ................. B60R 13/0206 24/293 |
| 2004/0155162 | A1 | | 8/2004 | Schneider |
| 2011/0097137 | A1 | * | 4/2011 | Spitz ....................... F16B 2/243 403/33 |
| 2016/0068118 | A1 | * | 3/2016 | Benedetti .............. F16B 5/0657 24/458 |
| 2016/0230794 | A1 | | 8/2016 | Baumeister et al. |
| 2016/0230967 | A1 | | 8/2016 | Baumeister et al. |
| 2016/0234958 | A1 | | 8/2016 | Baumeister et al. |

\* cited by examiner

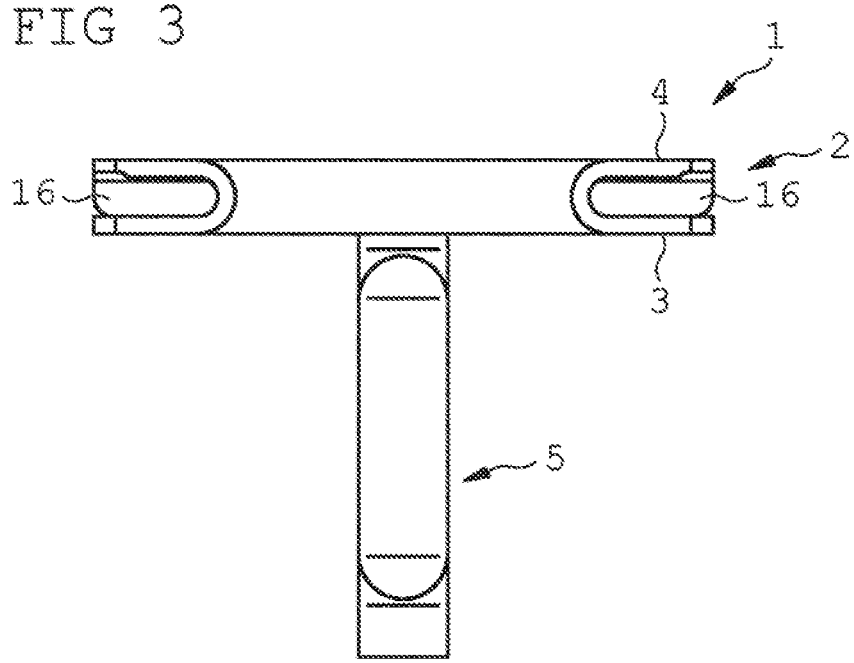
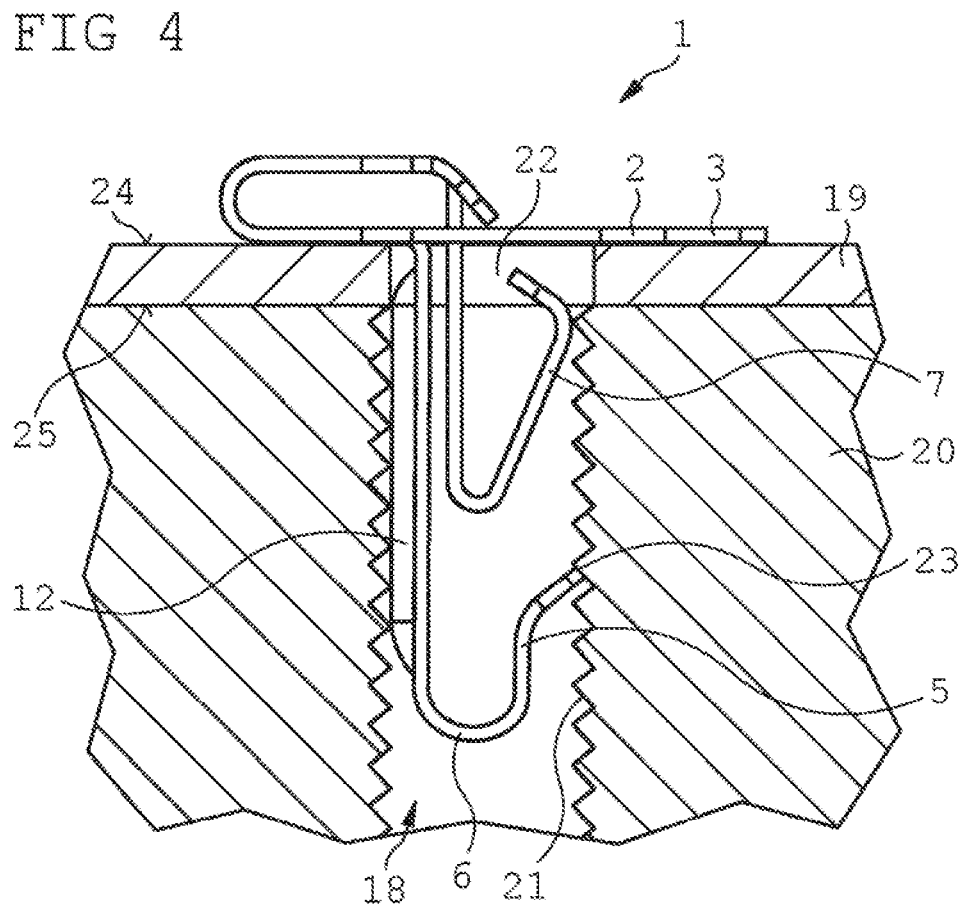

SYSTEM FOR FASTENING A PLANAR ELEMENT TO A COMPONENT AND FASTENING CLIP FOR USE IN SUCH A SYSTEM

FIELD OF THE INVENTION

The present invention relates to a system for fastening a planar element, which has a cut-out, to a component, which has an opening with at least one latching means, having a fastening clip according to the preamble of claim 1. The fastening clip has a contact section having at least one contact plane for contacting a first side of the planar element, which is facing away from the opening, and wherein the fastening clip has a first flexible retaining element, which is connected to the contact section and is designed in such a way that, after the planar element has been fastened to the component, it reaches through the cut-out of the planar element and into the opening, when the contact plane lies on the first side of the planar element. The invention further relates to a fastening clip for use in such a system.

BACKGROUND OF THE INVENTION

In the automotive industry and in other industrial branches, it is often necessary to secure planar elements to components. The planar elements may be, for example, insulating mats. These have to be mounted in vehicles sometimes in hard-to-reach places. In this case a quick and easy fastening of the insulation mats is desirable. It is a further requirement to ensure a sufficiently stable fastening of the planar element to a surface of the component.

In the prior art, fastening clips are known, which allow a fixing of a planar element to a component which has a threaded borehole. The component can be a wall, a metal body or another object that has a surface on which the planar element is to be fixed. The prior art fastening clips have a contact plane with a flexible retaining element. The retaining element is guided through a cut-out in the planar element into the borehole and engages in the borehole. The fastening clip is inserted into the cut-out such that a contact section of the fastening clip rests on one side of the planar element, which faces away from the borehole. In this position, there is a frictional connection between a wall of the borehole and the retaining element. This will hold the fastening clip in the borehole. The fastening clip can be removed from the borehole by bending the retaining element such that the frictional connection between the retaining element and the wall of the borehole is released.

However, prior art fastening clips of this type have the disadvantage that their assembly is cumbersome. If a fastening clip is introduced into the planar element before the planar element has been applied to the component, then the fastening clip easily falls out of the planar element.

BRIEF SUMMARY OF THE INVENTION

It is therefore an object of the present invention to provide a system with a fastening clip and a fastening clip usable in such a system having improved mounting characteristics.

BRIEF DESCRIPTION OF THE DRAWINGS

Advantageous embodiments of the invention are illustrated in the drawings.

FIG. 3 is a schematic view of the fastening clip in a front view and

FIG. 4 is a schematic representation of the fastening clip in a system upon connection of a planar element to a component in a cross-sectional view.

DETAILED DESCRIPTION OF THE INVENTION

Figure 1:
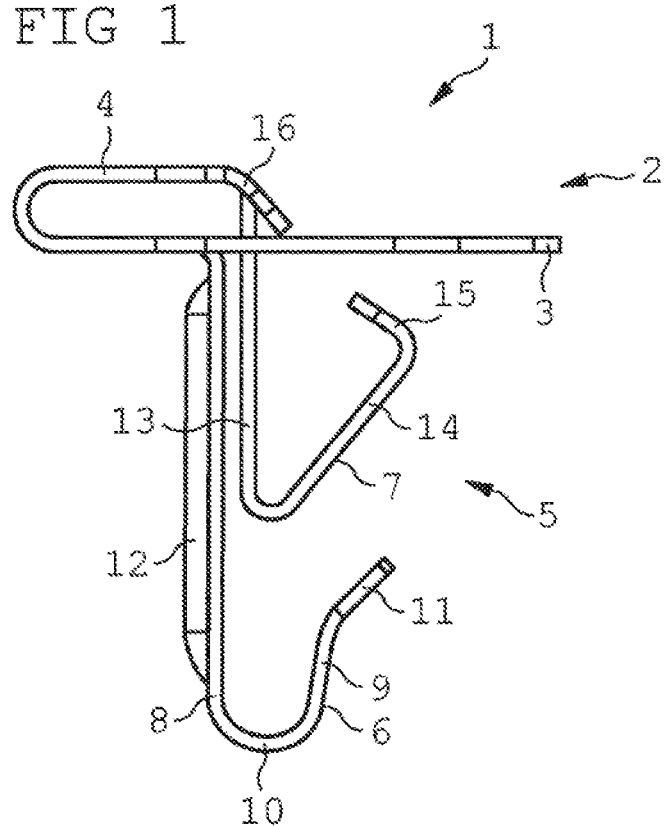
FIG. 1 is a schematic representation of a fastening clip in a side view.

This object is achieved by a system having the features of claim 1 and by a fastening clip according to claim 14, which is usable in such a system. According to the invention, the fastening clip has a second, elastic retaining element which is connected to the contact section and is designed such that it engages behind the planar element on a second side of the planar element which faces the borehole through the cut-out of the planar element in such a way that a pressing force is exerted on the second side of the planar element by the fastening clip even before the fixing of the planar element on the component, when the contact plane rests on the first side of the planar element.

Thus, the fastening clip can reach through the cut-out of the planar element and be held securely there before the planar element has been mounted on the component. The fastening clip now exerts a pressing force on the planar element from both sides, i.e. on the first side of the planar element through the contact plane and on the second side of the planar element through the second retaining element. As a result, the fastening clip is securely held in the cut-out and can not fall out of it before the planar element is mounted on the device. Thus, the fastening clips in the system according to the invention, for example, may already be completely pre-assembled on the planar element at a vehicle part supplier. At the vehicle manufacturer then the fastening clips must be only pressed with their first retaining element in the corresponding openings on the respective component. As a result, the cycle times can be significantly reduced in a production line.

An accurate positioning of the planar element on a component is likewise facilitated by the fastening clip according to the invention, since the planar element can be pushed over a surface of the component with the fastening clip already fastened thereto until the first retaining element penetrates into an opening in the component. The opening can thus be found more easily.

In addition to the fact that the fastening clip according to the invention facilitates pre-assembly, it is also particularly advantageous in the removal of a planar element from a component. In the previously known fastening clips of the prior art, the problem arises that they can easily fall out of a cut-out in the planar element after removal. This problem does not occur in the fastening clip according to the invention, because it is held securely by the second retaining element on the planar element. If it is desired to remove the fastening clip from the planar element, then the second retaining element may be compressed and pulled out through the cut-out in the planar element.

If the contact plane rests against the planar element and the first retaining element is introduced into the opening, then the second retaining element can be pushed aside by an edge of the opening so that it no longer or only partially rests on the second side of the planar element. However, if a cross-section of the cut-out in the planar element is smaller than a cross-section of the opening, then the second retaining element can engage behind the planar element and exert a force thereon. Surprisingly, it has been found that also the retention of the fastening clip in the opening is improved by the second retaining element. The second fastening element results in improved stability of the fastening clip against forces exerted on the fastening clip. Thereby, a frictional or a positive connection of the first retaining element with the opening can be improved.

Preferably, the first retaining element engages in the opening such that a frictional connection between the first retaining element and the opening is formed. However, according to the invention, the first retaining element can also form a different connection with the opening, for example a magnetic connection or a positive locking connection.

Particularly preferably, the first retaining element and the second retaining element are planar. According to the invention, the first and the second retaining element may be formed as tongue-shaped, elongate elements. Elements thus formed can be easily composed of common materials and are easily bendable due to their shape in a direction perpendicular to a flat side of the tongue-shaped element.

According to a particular embodiment of the invention, the opening is formed as a borehole and the latching device as a slot extending transverse to the axis of the borehole, in particular as a plurality of spaced-apart grooves or as a thread with at least one thread groove. A thread as a latching means can be provided on many components in a simple manner. In this case, the first retaining element engages in a thread groove of the thread when the contact plane lies on the first side of the planar element, so that the fastening clip is fixed in the thread in an axial direction of the thread. According to this embodiment, a particularly strong retention of the fastening clip in the borehole is achieved, since a positive connection between the fastening clip and the thread or the slot is achieved. To insert the fastening clip into the borehole, it can be screwed along and into the thread.

However, according to possible embodiments of the invention, the fastening clip may also initially be slidingly moved over a plurality of thread grooves or slots before it engages in a thread groove or in a slot.

The fastening clip can be removed from the borehole by a rotary motion. As an alternative to a threaded borehole, the opening may also have a different cross-section, such as oval, square or rectangular and the thread grooves are replaced by transverse slots. The first retaining element can also be dimensioned exactly so that it completely passes through an opening in a component and abuts against an inner or rear wall of the component, which is adjacent to the lower side of the opening.

The first retaining element is formed in such a way that it is adapted to engage in the thread or the slot of the opening. While the first retaining element is rotated out of the borehole, the second retaining element can still exert a pressing force on the planar element, so that the rotational movement is stabilized. Alternatively, however, it is also possible to release the second side element from the cut-out before the first fastening element has been completely unscrewed from the opening.

Preferably, the first retaining element or the second retaining element each have a first leg, which opens out in a second leg, wherein the first leg and the second leg enclose an acute angle. With such a structure, the elastic first or second retaining element can fulfill its retaining function particularly well, while having low material costs. The angle between the first and the second leg can preferably be changed elastically.

Most preferably, the first leg and the second leg of the first retaining element are spaced apart by a connection element, wherein the first leg and the second leg are aligned in such a way that two imaginary straight lines passing through the first leg and the second leg are either parallel to each other or enclose an angle of up to 20°, preferably less than 10°. This allows a particularly good operative connection of the first retaining element with the opening.

According to the invention, a first retaining section may be formed at one end of the second leg of the first retaining element, which is oriented at an angle of 25° to 65°, preferably between 35° and 55° on a side of the first retaining element facing the thread with respect to the second leg of the first retaining element. Due to its inclination angle, the retaining element is suitable for engaging a turn of the thread or in a slot in the side wall of the opening. The retaining element may be elastic. In this case, when inserting the fastening clip into the borehole, the retaining element can be pulled over or through several slots or turns of a thread due to its inclination angle. However, if one tries to remove the fastening clip from the borehole, then the retaining element, due to its inclination angle, can not be elastically deformed in such a way that it comes loose from the groove or turn in which it engages.

Preferably, the first retaining element tapers towards a tip of the retaining element. This facilitates an engagement of the retaining element in a turn of the thread of the borehole. The first retaining element may be formed tapered in a triangular or a rounded shape towards the retaining element tip. However, according to the invention, other forms are also possible in which the first retaining element can be tapered towards the retaining element tip. According to the invention, the first leg of the first retaining element may have a corrugation or an indentation. This reduces the elasticity of the first leg of the first retaining element. In addition, this provides a defined area for resting flat against an inner wall of the opening. It has been found that an embodiment of the fastening clip, which has a corrugation in the first leg of the first retaining element, engages particularly well in the opening and the retaining element is able to exert particularly high retaining forces due to the counterpressure of the corrugation.

Between the first leg and the second leg of the second retaining element an angle of 25° to 65°, preferably between 35° to 55°, is preferably provided. Due to its inclination angle, the retaining element is adapted to exert a large restraining force on the planar element, and it is also adapted to be passed through the cut-out in the planar element. By pressing the first and the second leg of the second retaining element together, it is possible to extract the fastening clip from the cut-out in the planar element.

According to the invention a second retaining section, which branches out at a right angle from the second leg of the second retaining element and which is directed towards the first leg is provided at one end of the second leg of the second retaining element may provided. The second retaining section is preferably planar. Such a branching retaining section increases a surface on which the second retaining element is able to exert a contact force on the planar element. As a result, the second retaining element rests on the planar element in a particularly stable manner. In addition, by the inwardly bent second retaining section, the planar element can be moved laterally more easily in the direction thereof.

According to a possible embodiment of the invention, the first retaining element is connected at the contact plane with the contact section. If the fastening clip holds a planar element on a component, then the fastening clip and thus also the contact plane are pressed against the planar element by the second retaining element, as a result of which the contact plane can hardly be displaced by an external action on the fastening clip. Thus, the first retaining element provided at the contact plane is particularly resilient to external influences when the planar element is fastened to the component.

According to a further embodiment of the invention, the second retaining element is connected to the contact section at a pivot plane, wherein the pivot plane is elastically connected to the contact plane. Thus, the second contact section is elastically held on the fastening clip. If the fastening clip is passed through the cut-out of the planar element, the pivot plane can be inclined in the direction of the contact plane. This allows the second retaining element to engage behind the planar element. The thicker the planar element is formed, the farther the pivot plane has to be inclined in the direction of the contact plane so that the second retaining element can engage behind the planar element.

Most preferably, the pivot plane is spaced from the contact plane by at least one spacer element. This avoids that the pivot plane directly contacts the contact plane, when the pivot plane is inclined in the direction of the contact plane. This avoids that the pivot plane is inclined too far in the direction of the contact plane, wherein a transition region between the pivot plane and the contact plane could be damaged such that the pivot plane and the contact plane are no longer elastically connected.

Alternatively, the first retaining element and the second retaining element are arranged in a plane. This allows a particularly compact design of the fastening clip. Such a structure is also expedient, since in this way a contact point of the first retaining element with the opening and a contact point of the second retaining element with the planar element lie in a plane, whereby the fastening clip rests particularly stably on the opening and the planar element.

Most preferably, the fastening clip is made integral. An integral fastening clip according to the invention is particularly stable and can be manufactured in a simple manner. According to a particular embodiment of the invention, the fastening clip is composed of a metal or a metal alloy. According to the invention, it is possible to produce the fastening clip from a metal strip from which a section is punched out, from which the fastening clip according to the invention is subsequently produced by bending the section. This manufacturing method makes it possible to inexpensively produce an integral fastening clip.

It is particularly advantageous if the fastening clip is made of steel. Steel in particular fulfils the requirements of a fastening clip according to the invention in terms of the parameters of tensile strength, elasticity and in particular heat resistance. A fastening clip made of steel—especially spring steel—retains its advantageous retaining properties even at high temperatures.

It is also possible according to the invention that the fastening clip is made of a suitable plastics material which has sufficient strength and elastic properties. Suitable plastic materials are, for example, polyamide, polyoxymethylene or polybutylene terephthalate.

A particularly advantageous application of a system according to the invention provides that the planar element is a cladding panel, an insulating panel or an insulating body for aerodynamic, design-related, haptic, acoustic and/or thermal cladding or insulation in the automotive sector. Such cladding or insulation panels must be mounted very often under difficult conditions in ever-narrower engine compartments, as interior trim in hard-to-reach areas of the passenger compartment or on the exterior of a vehicle (for example, as underbody protection or underbody trim part). The inventive system offers a significant simplification for pre-assembly, transport and final assembly.

For a fastening clip, which has already been previously described in detail in connection with the inventive system, for use in an inventive system, an independent protection is also claimed as a separate component. Likewise, an independent protection is claimed for a planar element, in the cut-outs of which such fastening clips are arranged in a pre-assembled state.

FIG. 1 shows a schematic representation of a possible embodiment of the system according to the invention with a fastening clip 1 preferably used therein in a side view. The fastening clip 1 has an contact section 2. The contact section 2 is adapted to be placed on a first side of a planar element 19 (see FIG. 4). The contact section 2 comprises a contact plane 3 for this purpose. It further comprises a pivot plane 4. The fastening clip 1 also has a connection section 5. The connection section 5 serves to ensure a secure connection of the fastening clip 1 with the planar element 19 and a component 20 (see FIG. 4). For this purpose, the connection section 5 has a first retaining element 6 and a second retaining element 7. The first retaining element 6 and the second retaining element 7 may alternatively be arranged separately on the contact section 2 without a common connection section 5.

The first retaining element 6 is adapted to engage in an opening 18 on the component 19, which opening is preferably formed as a borehole 18, so that the fastening clip 1 can not be pulled out of the borehole 18. The second retaining element 7 is suitable for engaging behind the planar element 19 in such a way that, by means of the fastening clip 1, a pressing force acts on a second side 25 of the planar element when the contact plane 3 lies on a first side 24 of the planar element 19. Thus, the fastening clip 1 is held preassembled on the planar element 19, even when the element is still not arranged on the component 20.

The first retaining element 1 is connected to the contact plane 3. The second retaining element 7 is connected to the pivot plane 4. The contact plane 3 is elastically connected to the pivot plane 4, so that the pivot plane 4 can be pivoted in the direction of the planar element 19, so that the second retaining element 7 can engage behind planar elements of different thicknesses. However, the second retaining element 7 is also elastic in itself, so that it is able to adapt its shape for this purpose.

As a result, the first retaining element 6 is stabilized against forces that act on the first retaining element 6 in the radial direction relative to the opening 18. The first retaining element 6 has a first leg 8, a second leg 9 and a connection element 10 between the first leg 8 and the second leg 9. At one end of the second leg 9, the first retaining element 6 has a first retaining section 11, which is adapted to engage in a thread groove 23 of a thread 21 or in a slot 23 which form a latching device 21 in the borehole 18. The first leg 8 has an indentation 12.

The second retaining element 7 comprises a first leg 13 and a second leg 14. At one end of the second leg 13 a second retaining section 15 is provided, which is adapted to exert a force on the second side of the planar element 19. The fastening clip 1 is composed of one piece of steel. The pivot plane 4 is spaced from the contact plane 3 by a spacer element 16.

Figure 2:
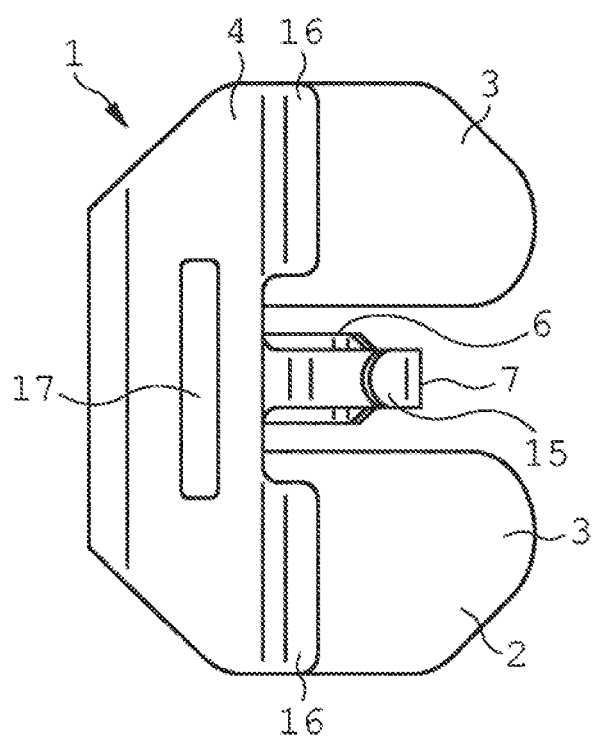
FIG. 2 is a schematic representation of the fastening clip in a plan view.

FIG. 2 shows a schematic representation of the fastening clip 1 according to the invention according to FIG. 1 in a plan view. The contact section 2 has two contact planes 3. In the pivot plane 4 a groove 17 is provided. Shown are also the two spacer elements 16, which are provided at the pivot plane 3, the first retaining element 6, the second retaining element 7 and the second retaining section 15. The second retaining section 15 is tapered towards one end and rounded.

FIG. 3 shows a schematic representation of the fastening clip 1 according to the invention according to FIGS. 1 and 2 in a front view. In this case, the contact section 2 and the connection section 5 are shown. The contact plane 3, the pivot plane 4 and two spacer elements 16 are visible in the contact section 2. Only the first retaining element 6 with the indentation 12 is visible in the connection section 5.

FIG. 4 shows a schematic representation of the system according to the invention. The system comprises the fastening clip 1 according to the invention, which has already been described in detail above, the planar element 19 provided with at least one cut-out 22 and the component 20 on which the planar element 19 can be fixed by means of preferably a plurality of fastening clips 1 spaced apart from one another. A borehole 18 of the component 20 is shown with a fastening clip 1 received therein in a cross-sectional view. The fastening clip 1 holds the planar element 19 on the component 20, in which the borehole 18 is introduced. The borehole 18 has a thread 21 which is provided as a latching device 21. The fastening clip 1 reaches through a cut-out 22 in the planar element 19. This embodiment has no spacer elements 16. The fastening clip 1 engages with the first retaining element 6 in a thread groove 23 of thread 21, which serves as a latch, or in a corresponding slot 23, which is transverse to the axis of the opening or borehole 18. In this case, the first retaining element 6 rests with its corrugation or indentation 12 on an opposite side of the opening 18. The fastening clip 1 is thus firmly set in the borehole or opening 18 and can not be removed therefrom.

The planar element 19 has a first side 24 and a second side 25. The contact plane 3 of the fastening clip 1 rests on the first side 24. The second side 25 of the planar element 19 rests on the component 20. In this completely assembled state the second retaining element 7 can no longer engage behind the planar element 19, since the borehole 18 has a diameter which corresponds approximately to a diameter of the cut-out 22 of the planar element 19 and the fastening clip 1, upon being pressed into the borehole 18, has been moved so far that the angled upper part of the second retaining element 7 has moved so far to the left in the opening 22 that it has been disengaged from the second side 25 of the planar element 19.

The system according to the invention and the fastening clip preferably used therein are particularly advantageous for use for pre-assembly on insulating plates or insulating bodies for acoustic and/or thermal insulation in the automotive sector and for their subsequent final assembly on an automobile.

LIST OF REFERENCE NUMERALS 1 fastening clip
2 contact section
3 contact plane
4 pivot plane
5 connection section
6 first retaining element
7 second retaining element
8 first leg of the first retaining element
9 second leg of the first retaining element
10 connection element
11 first retaining section
12 indentation
13 first leg of the second retaining element
14 second leg of the second retaining element
15 second retaining section
16 spacer element
17 slot
18 opening (borehole)
19 planar element
20 component
21 latching device (thread)
22 cut-out
23 latching arrangement (thread groove; slot)
24 first side of the planar element 19
25 second side of the planar element 19

The invention claimed is:

1. A system for fastening a planar element (19), which has a cut-out (22), to a component (20), which has an opening (18) with at least one latching means (21), having a fastening clip (1) which has a contact section (2) having at least one contact plane (3) for contacting a first side (24) of the planar element (19), wherein the fastening clip (1) has a first elastic retaining element (6), which is connected to the contact section (2) and is designed in such a way that, after the planar element (19) has been fastened to the component (20), it reaches through the cut-out (22) of the planar element (19) and into the opening (18), when the contact plane (3) lies on the first side (24) of the planar element (19), characterized in that the fastening clip (1) has a second elastic retaining element (7), which is connected to the contact section (2) and is designed in such a way that, before the planar element (19) is fastened to component (20), the second retaining element reaches through the cut-out (22) of the planar element (19) and behind the planar element (19) on a second side (25) of the planar element (19) in such a way that a pressing force is applied by the fastening clip (1) to the second side (25) of the planar element (19) when the contact plane (3) lies on the first side (24) of the planar element (19) and wherein the second retaining element (7) of the fastening clip (1) has a first leg (13) and opens out in a second leg (14), wherein the first leg (13) and the second leg (14) enclose an acute angle, wherein the first retaining element (6) of the fastening clip (1) has a first leg (8) and opens out in a second leg (9), wherein the first leg (8) and the second leg (9) enclose an acute angle.

2. The system of claim 1, characterized in that the first leg (8) and the second leg (9) of the first retaining element (6) are spaced apart by a connection element (10), wherein the first leg (8) and the second leg (9) are aligned in such a way that they are aligned in parallel to each other or enclose an angle of up to 20°, preferably less than 10°.

3. The system of claim 2, characterized in that a second retaining section (15), which branches out at an angle from the second leg (14) of the second retaining element (7) and which is directed towards the first leg (13) is provided at one end of the second leg (14) of the second retaining element (7).

4. A planar element (19) for use in a system according to claim 2, in the cut-outs (22) of which fastening clips (1) are arranged in a pre-assembled state.

5. The system of claim 1, characterized in that at one end of the second leg (9) of the first retaining element (6) a first retaining section (11) is formed, which is oriented at an angle of 25° to 65°, preferably between 35° and 55° on a side of the first retaining element (6), which faces the slot (23) or thread groove (23) with respect to the second leg (9) of the first retaining element (6).

6. A planar element (19) for use in a system according to claim 5, in the cut-outs (22) of which fastening clips (1) are arranged in a pre-assembled state.

7. The system of claim 1, characterized in that the first retaining element (6) is designed as to be tapered towards a tip of the retaining element.

8. A planar element (19) for use in a system according to claim 7, in the cut-outs (22) of which fastening clips (1) are arranged in a pre-assembled state.

9. The system of claim 1, characterized in that the first leg (8) of the first retaining element (6) has a corrugation or an indentation (12).

10. The system of claim 1, characterized in that an angle of 25° to 65°, preferably between 35° and 55° is provided between the first leg (13) and the second leg (14) of the second retaining element (7).

11. A planar element (19) for use in a system according to claim 1, in the cut-outs (22) of which fastening clips (1) are arranged in a pre-assembled state.

\* \* \* \* \*